April 13, 1937.   J. J. MASSON   2,076,659
STEP, BASE, AND CURBING GAUGE AND TOOL
Filed Sept. 22, 1936
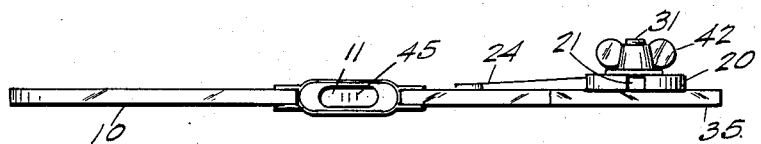
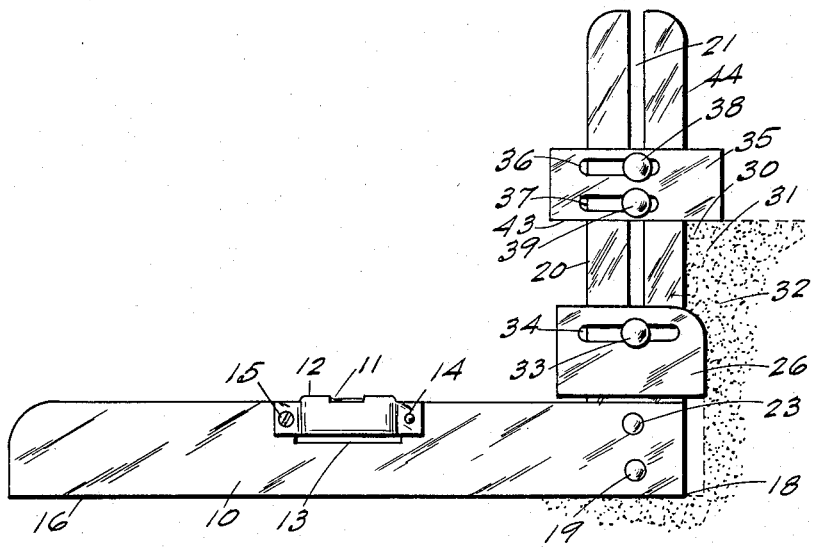
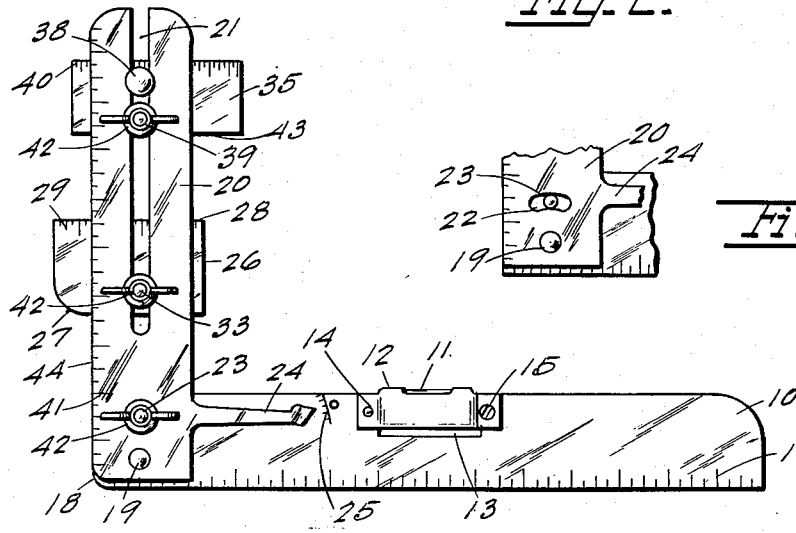
INVENTOR.
Jules J. Masson
BY Philip A. Friedell
ATTORNEY.

Patented Apr. 13, 1937

2,076,659

UNITED STATES PATENT OFFICE 2,076,659

STEP, BASE, AND CURBING GAUGE AND TOOL

Jules J. Masson, Oakland, Calif.

Application September 22, 1936, Serial No. 101,936

9 Claims. (Cl. 33—89)

This invention, a step, base, and curbing gauge and tool, is particularly designed for gauging the height and pitch of risers and slope of treads, projection of nosing on steps, bases and curbs, depth of steps, bases, and curbs, and for forming the nosing on the above-named structures when formed of plastic materials, such as concrete or grout.

The objects and advantages of the invention are as follows:

First; to provide a gauge which is adjustable for slope of tread, pitch or inclination of riser, rise, and projection and height of nosing.

Second; to provide a gauge of the type outlined in which the base member, rise member, nosing member and tread member are all suitably graduated and adjustable relative to each other as to spacing and angularity, to form a template of the specific complementary form of the step, base, or curb desired.

Third; to provide indicating means for indicating the relative variation from right-angular relation between a tread and a riser.

Fourth; to provide a gauge of the type outlined which may be used to form nosings on steps, bases and curbs.

Other objects and advantages of the invention will become apparent as the following description is read on the drawing forming a part of this specification, and in which similar reference characters are used to designate similar parts throughout the several views, of which;

Fig. 1 is a front elevation of the invention, showing the nosing gauge arranged for forming and gauging a square nosing.

Fig. 2 is a rear elevation of Fig. 1 with the nosing gauge arranged for forming and gauging a filletted nosing of less projection than that of Fig. 1 and with a lesser rise.

Fig. 3 is a plan view of Fig. 2.

Fig. 4 is a fragmentary view of the lower left hand portion of Fig. 1, showing the slot permitting angular adjustment between the base and riser members.

The invention consists of a horizontal or base member 10 having a level 11 adjustably mounted therein, the level being mounted in a housing 12, which is preferably located in a slot 13, the housing 12 being pivotally connected at one of its ends as at 14, to the base member 10, its other end being adjustably secured as by a screw 15, whereby the level may be adjusted in exact parallelism with the bottom 16 of the base 10. Graduations 17 are formed along the lower edge of the base member, beginning preferably at the corner 18 for gauging and measuring the depth of a tread or step.

Pivotally secured at 19 to the base member 10 is a vertical or riser member 20, having a slot 21 formed throughout the major portion of its height, and an arcuate slot 22 is formed in spaced relation to the pivot 19 for adjustable reception of a bolt 23 for securing the riser member in desired angular relation to the base member, for pitch of riser and slope of tread.

An indicator or pointer 24 is formed integral with the riser member 20 and is cooperatively related to a scale 25 formed in the base member 10 to indicate the relative angularity between base member and riser, with right-angular relation indicated as zero.

A nosing gauge and tool 26 has two diagonally related corners 27 and 28 respectively formed for filletted and square nosing corners, and has graduations 29 formed along one of its horizontal edges for gauging the projection 30 of the nosing 31 on a base, curb, or step 32, and this gauge is adjustably secured to the riser member 20 by means of a bolt 33 which is slidable in the slot 21, the nosing gauge being thus reversible for various forms of nosing, and adjustable as to height, and also adjustable as to projection through the medium of the slot 34, which permits full retraction of the gauge.

The riser or tread gauge 35 is adjustable as to rise and also as to projection, and may be made of any desired length and is adjustable as to angularity relative to the riser member 20 for parallelism with the base member, and has two parallel slots 36 and 37, in one of which is mounted a double headed rivet 38, which is slidable in both slots 21 and 36, and a bolt 39 is mounted through slots 21 and 37 and slidable in both slots, graduations 40 being formed along one or both horizontal edges of this gauge for gauging the width of the top of a base or curb, and may be made sufficiently long to measure the depth of a tread.

Graduations 41 are formed along the edge of the riser member for gauging the height of the members 26 and 35, and knurled or thumb nuts 42 are provided for adjustably securing the various members in various predetermined relations.

In use, the gauge is adjusted to suit the particular structure or operation.

For a step with nosing, the angularity of the base member 20 is adjusted to the desired slope of tread and pitch or inclination of riser, the tread or riser gauge 35 is adjusted with its lower edge 43 at the exact rise desired, and the nosing gauge 26 is adjusted for the form of fillet, projection of nosing and vertical width of nosing.

After grouting the nosing, the gauge in its adjusted condition may be used to form the nosing by sliding the tool along the step.

When no nosing is desired on steps, the member 26 is adjusted back and secured in a position where the member does not project beyond the edge 44 of the riser member. Graduations 45 are provided for indicating the relative slope of tread.

For curbs and bases, the nosing member is adjusted back out of the way and the riser member 35 is adjusted for depth and height of curb or base.

The under edge of the riser gauge may be used for forming the top of the base or curb, and may be formed to any desired shape.

It will be understood that the members 26 and 35 can be formed with various shaped corners, for bevels, concavities and convexities, and that the corner 18 may be either rounded or square, and that variations in construction and arrangement of parts, which variations are consistent with the appended claims, may be resorted to, without detracting from the spirit or scope of the invention, or sacrificing any of the advantages thereof.

I claim:

1. A step tool comprising tread slope gauging means, riser height and inclination gauging means mounted for angular adjustment on said tread slope gauging means, nosing projection and vertical height gauging means adjustably mounted on said riser height and inclination gauging means, and indicating means indicating the relative variation in angularity between said tread gauging means and said riser gauging means.

2. A step tool comprising tread slope gauging means, riser height and inclination gauging means mounted for angular adjustment on said tread slope gauging means, and nosing projection and vertical width gauging means reversible and adjustable for different forms of nosings and mounted on said riser height and inclination gauging means, and indicating means indicating the relative variation in angularity between said tread gauging means and said riser gauging means.

3. A step tool comprising a base member and a vertical member pivotally connected together and adjustable at will as to angular divergence, and means indicating the relative angularity therebetween, a riser gauge adjustably mounted on said vertical member for projectional and height adjustment, and a nosing member adjustable vertically and horizontally on said vertical member for gauging and forming a nosing.

4. A step tool comprising a base member and a riser member pivotally connected thereto and adjustable at will angularly relative to right-angular relation, a riser gauge adjustable vertically and transversely on said riser member, a nosing member rotatably, vertically and transversely adjustable on said riser member, means indicating the relative slope of said base member to the horizontal, and means indicating the angular variation between said base and riser members from a right-angle.

5. A step tool comprising a base member having graduations formed along one longitudinal edge, a riser member pivotally connected at its lower end to one end of said base member and having graduations formed along one of its vertical edges, and means for securing said members in angularly adjusted positions at will, a riser gauge slidably adjustable on said riser member for rise and projection and having graduations formed along one horizontal edge, and means for indicating the angularity of said base member relative to a horizontal plane.

6. A step tool comprising a base member having graduations formed along one longitudinal edge, a riser member having its lower end pivotally connected to one end of said base member and having graduations formed along a vertical edge, and means for securing said members in angularly adjusted positions at will, a riser gauge slidably adjustable on said riser member for rise and projection and having graduations formed along one horizontal edge thereof, a nosing member slidably and rotatably adjustable on said riser member for rise and projection and to present various shaped fillet-forming edges at will and having graduations formed along an edge to indicate the degree of projection from the riser member, and means indicating the angularity of said base member relative to a horizontal plane.

7. A step tool comprising a base member having graduations formed along a lower edge, a riser member having its lower end pivotally connected to one end of said base member and having graduations formed along one of its vertical edges, means for securing said members in predetermined angular relations at will, a riser gauge slidably adjustable on said riser member for rise and projection and having graduations formed along one of its horizontal edges, and means indicating the variation in angularity between said base and riser members relative to a right angle.

8. A step tool comprising a base member having graduations formed along one longitudinal edge, a riser member having its lower end pivotally connected to one end of said base member and having graduations for indicating rise, and means for securing said members in angularly adjusted positions at will, a riser gauge slidably adjustable vertically and transversely on said riser member for rise and projection and having graduations to indicate the degree of projection, a nosing member slidably and rotatably adjustable on said riser member for rise and projection and to present various shaped fillet-forming edges at will and having graduations formed to indicate the degree of projection from the riser member, means indicating the angularity of said base member relative to a horizontal plane, and means indicating the variation in angularity between said base and riser members relative to a right angle.

9. A step gauge comprising a base member having graduations formed along a lower longitudinal edge, a level mounted in the upper edge thereof and having graduations indicating the degree of slope of the base member, a riser member having its lower end pivotally connected to one end of said base member, and a scale formed along one vertical edge of said riser member, means for securing said riser member in angularly adjusted position on said base member, an indicating pointer integral with said base member and cooperatively related to a scale formed on said base member, a slot formed in said riser member and extending from its upper end the major portion of the distance to the base member, a riser gauge adjustable in said slot for rise and adjustable relative to said riser member for projection and having a scale formed thereon for indicating the degree of projection, and a nosing member adjustable in said slot for rise, and adjustable relative to said riser member for projection, and adjustable rotatably to present various shaped fillet-forming edges and being scaled to indicate the degree of projection of the fillet-forming edge.

JULES J. MASSON.